United States Patent
Ishiyama et al.

(10) Patent No.: US 7,908,356 B2
(45) Date of Patent: Mar. 15, 2011

(54) NAME RESOLUTION DEVICE AND NAME RESOLUTION METHOD WITH AUTOMATIC NODE INFORMATION UPDATING FUNCTION

(75) Inventors: Masahiro Ishiyama, Kawasaki (JP); Tatuya Jimmei, Kawasaki (JP); Yuzo Tamada, Yokohama (JP); Kenichi Nagami, Ichikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1193 days.

(21) Appl. No.: 10/671,738

(22) Filed: Sep. 29, 2003

(65) Prior Publication Data

US 2004/0133675 A1 Jul. 8, 2004

(30) Foreign Application Priority Data

Sep. 30, 2002 (JP) ................................ P2002-287717

(51) Int. Cl.
*G06F 15/173* (2006.01)
(52) U.S. Cl. ........................................ 709/224
(58) Field of Classification Search ................ 709/224, 709/238, 239, 242, 244
See application file for complete search history.

(56) References Cited

U.S. PATENT DOCUMENTS

| | | | |
|---|---|---|---|
| 5,185,860 A * | 2/1993 | Wu | 709/224 |
| 6,101,499 A * | 8/2000 | Ford et al. | 707/10 |
| 6,747,961 B1 * | 6/2004 | Ahmed et al. | 370/328 |
| 7,280,999 B2 * | 10/2007 | Chung et al. | 707/2 |
| 2002/0087722 A1 * | 7/2002 | Datta et al. | 709/239 |

OTHER PUBLICATIONS

P. Mockapetris, "Domain Names—Implementation and Specification", RFC 1035, pp. 1-55, (Nov. 1987).
S. Deering et al., "Internet Protocol, Version 6 (IPV6) Specification", RFC 2460, pp. 1-37, (Dec. 1998).

* cited by examiner

*Primary Examiner* — Kenny S Lin
*Assistant Examiner* — Farhad Ali
(74) *Attorney, Agent, or Firm* — Finnegan, Henderson, Farabow, Garrett & Dunner, L.L.P.

(57) ABSTRACT

In a name resolution device for managing a name of each node connected to a network and an address for identifying each node, a node information containing a name of a node, a network identification information, a prefix indicating a position on the network, and an interface identification information of a node is stored for each node, and the node information of other nodes connected to the network is collected through the network. Then, the stored node information is updated according to the collected node information of the other nodes, by updating the stored prefix by using the interface identification information contained in the collected node information as a key.

15 Claims, 3 Drawing Sheets

FIG. 2  { foo  3ffe::230:65ff:fe1a:3525  prefixlen 64
        { bar  3ffe::203:93ff:fe00:e6ac  prefixlen 64

FIG. 3  { name           = foo
        { network ID     = 3ffe::/64
        { network prefix = 3ffe::/64
        { Interface ID   = ::230:65ff:fe1a:3525

FIG. 4  { name           = bar
        { network ID     = 3ffe::/64
        { network prefix = 3ffe::/64
        { Interface ID   = ::203:93ff:fe00:e6ac

FIG. 5
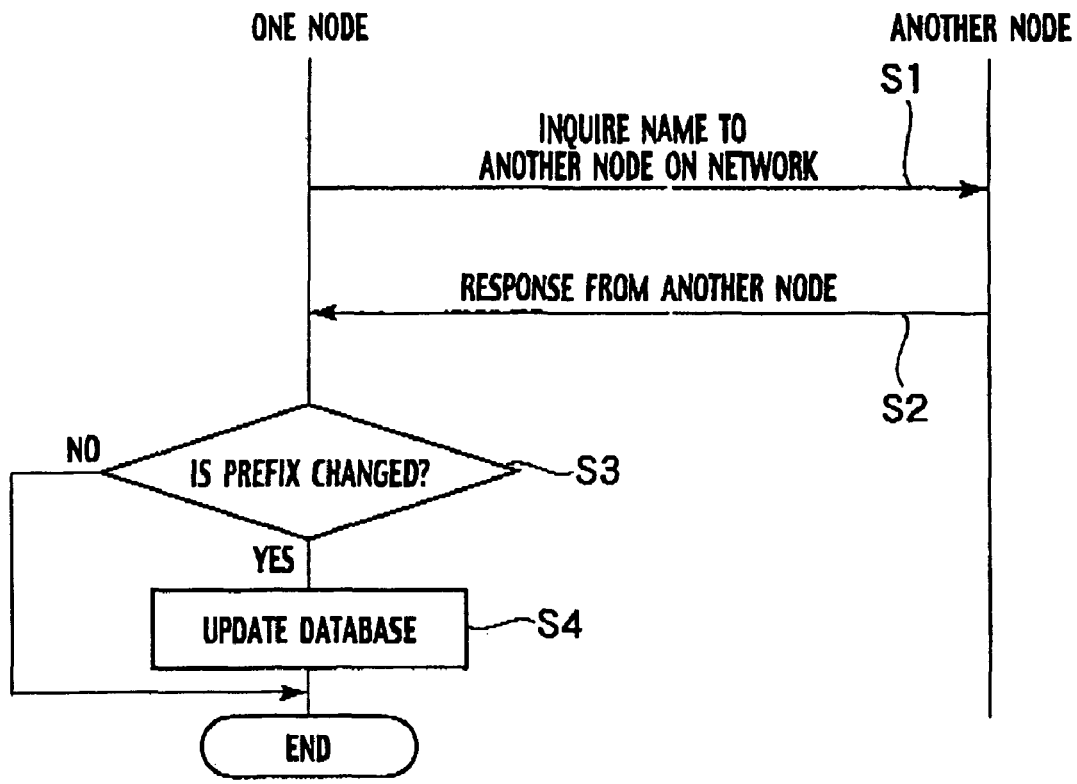
FIG. 6
{ foo  2001 :: 230 : 65ff : fe1a : 3525  prefixlen 64
  bar  2001 :: 203 : 93ff : fe00 : e6ac  prefixlen 64
FIG. 7
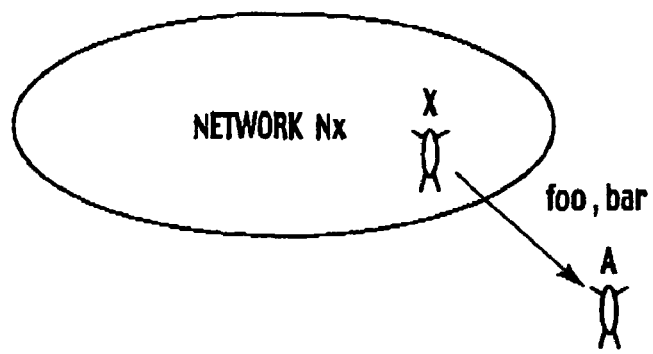

NAME RESOLUTION DEVICE AND NAME RESOLUTION METHOD WITH AUTOMATIC NODE INFORMATION UPDATING FUNCTION

BACKGROUND OF THE INVENTION

1. Field of the Invention

The present invention relates to a name resolution device and a name resolution method for appropriately updating a name of each node on a network.

2. Description of the Related Art

In recent years, the world's largest computer network called internet has been spreading rapidly, and new computer businesses have been developed by utilizing information or service publicly disclosed by being connected to the internet, or conversely by providing information or service to external users who make accesses through the internet. There are also development and evolution of new techniques regarding the internet utilization.

On the internet, each computer has an identifier called IP address, and the packet exchanges are carried out based on this IP address. However, the IP address is a numerical value, which is not intuitive for a direct use by the human being so that it lacks the convenience. For this reason, a mechanism for converting the IPv6 address into a character string that is easier to handle for the human being, that is "name", has been used. Currently, the most widely utilized conversion mechanism on the internet is DNS (Domain Name System).

The DNS is used for a global name resolution on the internet, so that a name FQDN (Fully Qualified Domain Name) used by the DNS must be uniquely defined on the internet.

On the other hand, due to the spread of the internet, the need for every node to have a globally unique name is diminishing. Also, in the DNS, because of its name disclosure property, it is impossible to publicly disclose a name of some node only to specific members. Consequently, what name does some domain have can be discovered by the brute force, and a malicious third person can easily acquire information regarding nodes with what names are existing. This causes the problem of the privacy leakage. In addition, in order to utilize the FQDN, there is a need to provide a DNS server for managing that FQDN, and this gives rise to the problem of the arranging location, the management, the registration, and the running of this server.

On the other hand, for a small network such as a home network, there are some propositions for a technique of defining a name locally on the network and making access to a node by using that name.

However, these techniques presuppose that the correspondent specified by the name is located in proximity from a viewpoint of the network, and they cannot be directly utilized in the case of attempting to make an access by using the name from an external of that network. In this case, a dedicated server responsible for the resolution from the external is required, or a protocol for discovering the server for that purpose is required, so that the user's convenience is damaged.

In order to avoid these problems, it is possible to use a method for utilizing a node local database. For example, in the OS such as Unix™, this is well known as "/etc/hosts" file.

In the case where some individual wishes the others to make accesses, it is possible to inform the name to the others by a method of exchanging data on address and name directly. However, the static database must be updated manually.

On the other hand, in the IPv6, it is expected that the renumbering will occur even in a small network such as a home network. Here, the renumbering implies the change of a network prefix to another value on some network.

This renumbering definitely occurs in the IPv6 when the user changed a provider, for example, because an address is basically assigned from a provider. At this point, in the case of utilizing the static node local database and information in the database has already been informed to someone, the occurrence of the renumbering must be informed, but there arises a problem of "who should be information of what" from a viewpoint of the privacy leakage. Namely, when an individual who has a node having two names of "foo" and "bar" on the network informs the name of his own node on the network to the others, there can be cases where it is desired to inform only "foo" to some people and inform only "bar" to some other people. In such a case, after the renumbering occurs, there arises a problem of "who should be informed of what".

BRIEF SUMMARY OF THE INVENTION

It is therefore an object of the present invention to provide a name resolution device and a name resolution method capable of informing the update information easily without damaging the privacy when the renumbering occurs on the network.

According to one aspect of the present invention there is provided a name resolution device for managing a name of each node connected to a network and an address for identifying each node, comprising; a node information storing unit configured to store a node information containing a name of a node, a network identification information, a prefix indicating a position oil the network, and an interface identification information of a node, for each node; a node information collecting unit configured to collect the node information of other nodes connected to the network, through the network; and a node information updating unit configured to update the node information stored in the node information storing unit, according to the node information of the other nodes collected by the node information collecting unit, by updating the prefix stored in the node information storing unit by using the interface identification information contained in the node information collected by the node information collecting unit as a key.

According to another aspect of the present invention there is provided a name resolution method for managing a name of each node connected to a network and an address for identifying each node, comprising: storing a node information containing a name of a node, a network identification information, a prefix indicating a position on the network, and an interface identification information of a node, for each node; collecting the node information of other nodes connected to the network, through the network; and updating the node information stored by the storing step, according to the node information of the other nodes collected by the collecting step, by updating the prefix stored by storing step by using the interface identification information contained in the node information collected by the collecting step as a key.

According to another aspect of the present invention there is provided a computer program product for causing a computer to function as a name resolution device for managing a name of each node connected to a network and an address for identifying each node, the computer program product comprising: a first computer program code for causing the computer to store a node information containing a name of a node, a network identification information, a prefix indicating a position on the network, and an interface identification information of a node, for each node; a second computer program code for causing the computer to collect the node information of other nodes connected to the network, through the network; and a third computer program code for causing the computer to update the node information stored in the first computer program code, according to the node information of the other nodes collected by the second computer program code, by updating the prefix stored in the first computer program code by using the interface identification information contained in the node information collected by the second computer program code as a key.

Other features and advantages of the present invention will become apparent from the following description taken in conjunction with the accompanying drawings.

BRIEF DESCRIPTION OF THE DRAWINGS

FIG. 2 is a diagram showing exemplary IPv6 addresses of two nodes connected to a network according to one embodiment of the present invention.

FIG. 3 is a diagram showing an entry for a name "foo" shown in FIG. 2, according to one embodiment of the present invention.

FIG. 4 is a diagram showing an entry for a name "bar" shown in FIG. 2, according to one embodiment of the present invention.

FIG. 5 is a sequence chart showing an operation sequence for a first exemplary updating of a database according to one embodiment of the present invention.

FIG. 6 is a diagram showing exemplary IPv6 addresses of two nodes after the renumbering, according to one embodiment of the present invention.

FIG. 7 is a diagram showing a network arrangement for explaining a second exemplary updating of a database according to one embodiment of the present invention.

DETAILED DESCRIPTION OF THE INVENTION

Referring now to FIG. 1 to FIG. 9, one embodiment of a name resolution device and a name resolution method according to the present invention will be described in detail.

Figure 1:
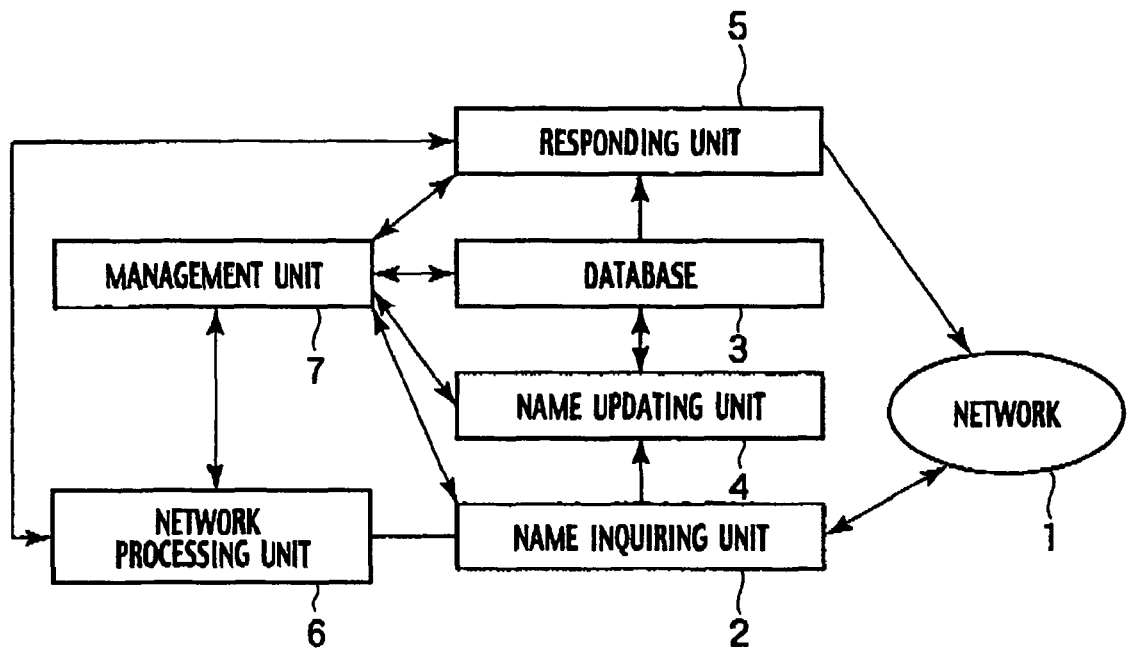
FIG. 1 is a block diagram showing a schematic configuration of a name resolution device according to one embodiment of the present invention.

FIG. 1 shows a schematic configuration of a name resolution device according to one embodiment of the present invention. The name resolution device of FIG. 1 is provided inside each node connected to a network 1. Here, the node is an arbitrary device having a communication function, such as PC, PDA (Personal Digital Assistants), portable telephone, home electronics node, etc.

The name resolution device of FIG. 1 has a name inquiring unit 2, a database 3, a name updating unit 4, a responding unit 5, a network processing unit 6, and a management unit 7.

The name inquiring unit 2 inquires names to the other nodes connected to the network 1, and collects node information of each node. The collected node information is stored into the database 3.

In the IPv6 (Internet Protocol version 6) which is a protocol on the Internet, it is possible to utilize ICMP (Internet Control Message Protocol) node information query. Note that the storing into the database 3 may be done manually, but in the following a mechanism for automatically collecting information will be described.

The name updating unit 4 judges whether the node information of each node on the network 1 has been changed or not, and if the node information has been changed, the name updating unit 4 updates the database 3.

The responding unit 5 returns the node information of the own node via the network 1, in response to an inquiry from the other nodes. The network processing unit 6 controls data transmission and reception via the network 1.

The management unit 7 manages the node information of each node inquired and collected by the name inquiring unit 2, in terms of name, network ID, network prefix, and interface ID. Here, the network ID is an identification information of the network 1 itself, the network prefix is an information indicating a position on the network 1, and the interface ID is an identification information of an interface of the node.

For example, suppose that the name inquiring unit 2 discovered two nodes connected to some network Nx. These two nodes have IPv6 addresses as shown in FIG. 2, and one has a name "foo", the other has a name "bar". In FIG. 2, "prefixlen 64" indicates that the prefix length of the network prefix is the upper 64 bits.

In this case, the information as shown in FIG. 3 and FIG. 4 will be stored into the database 3. Namely, as shown in FIG. 3, the name "foo", has the network ID "3ffe::/64", the network prefix "3ffe::/64", and the interface ID "::230:65ff:fela:3525". Also, as shown in FIG. 4, the name "bar" has the network ID "3ffe::/64", the network prefix "3ffe::/64", and the interface ID "::203:93ff:fe00:e6ac".

In the following, a set of the name, the network ID, the network prefix, and the interface ID will be referred to as an entry.

Each node can assign a unique name to each network ID stored in the database 3, such as "my home", "relative's home", etc.

Even in the case of connecting each node to the external network 1, it is possible to specify the IPv6 address of the correspondent by using the name defined by that node (which is not globally unique), by referring to the database 3 possessed by each node.

Each node can inform some entries from the local database 3 possessed by each node, selectively to the others (other nodes). In this way, it is possible to publicly disclose the name only to the others chosen by each node.

It is also possible for the name inquiring unit 2 to regularly and automatically collect the entries of the other nodes on the network 1 to which each node is connected.

The types and the names of the nodes connected to the network 1 will change in time, so that there is a possibility that an entry stored in the database 3 actually does not exist. For this reason, there is a need to update the database 3 regularly.

(First Exemplary Updating)

The first exemplary updating presupposes the case where the names of the other nodes on the network 1 can be collected by directly moving the node.

FIG. 5 shows an operation sequence for the first exemplary updating of the database 3. First, one node is connected to the network 1, and the name of another node on the network 1 is inquired (step S1). When there is a response from another node (step S2), the management unit 7 judges whether the prefix has been changed or not (step S3). If it is not changed, the processing is terminated, whereas if it is changed, the database 3 is updated (step S4).

At the step S3 described above, the prefix is updated according to the interface ID of each node on the network 1. Namely, in the case where a node that has the same interface ID but a different network prefix exists among the names collected by the name inquiring unit 2, the name updating unit 4 judges that the name has been updated, and updates the name by carrying out an operation to replace the network prefix corresponding to that interface ID in the database 3 by a new prefix.

For example, suppose that while one node M is away from the network Nx to which two nodes shown in FIG. 2 are connected, the renumbering occurs in this network Nx such that its network prefix has been updated from "3ffe::/64" to "2001::/64". Then, suppose that the node M moves into the network Nx after that, carries out the name collecting, and discovers two nodes shown in FIG. 8.

The interface IDs of the two nodes shown in FIG. 6 are the same as the interface IDs of the two nodes shown in FIG. 2, so that the name updating unit 4 of the node M judges that the network prefix has been changed from "3ffe::/64" to "2001::/64", and updates the database 3.

The interface ID described above is not necessarily globally unique, and tire first exemplary updating described above is applicable only in the case where the interface ID is in EUI-64 format which is globally unique relatively.

It is also possible to carry out the above described updating processing for the database 3 only in the case where the prefix of a default router of the network 1 to which the node belongs has been changed. Alternatively, it is also possible to ask the user whether the updating of the database 3 is permitted or not.

As described, in the first exemplary updating, the updating of the database 3 is carried out by judging that the node information has been updated, for the node information which has the same interface ID and a different network prefix, so that it is possible to automatically update the database 3.

(Second Exemplary Updating)

The second exemplary updating notifies the name update information only to the nodes whose identifies are known.

In the case where the own node is not directly connected to the network 1, such as the case where the information on nodes connected to the network 1 is learned from a third person, for example, even if the names are updated on that network 1, the database 3 cannot be updated unless the update information is learned from a third person. As a method for updating the database 3 in this case, it is possible to use a method in which the database 3 is updated by the third person who has new entries. In this method, the network prefix of all the entries which as the same value as the network ID of the entries before the updating in the database 3 will be changed to the value after the updating. In this way, it is possible to realize the prefix update efficiently, while maintaining the privacy.

Figure 8:
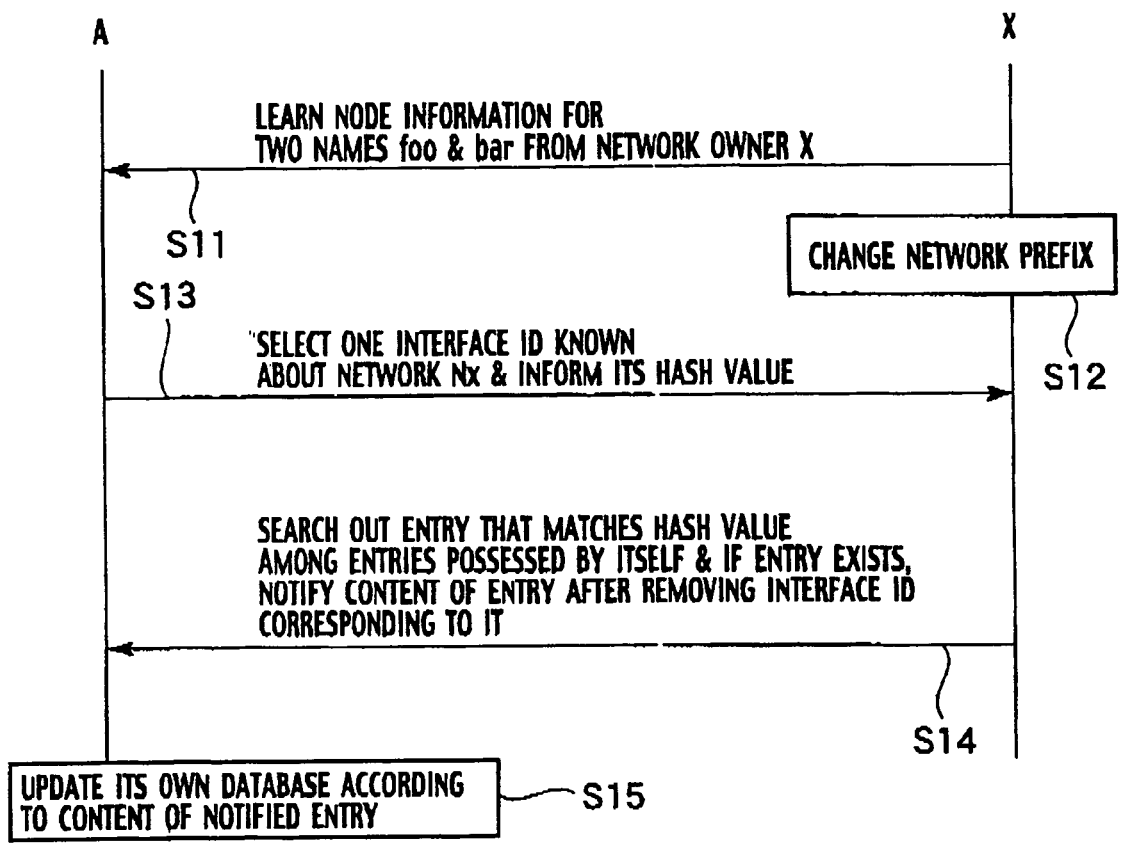
FIG. 8 is a sequence chart showing an operation sequence for a second exemplary updating of a database according to one embodiment of the present invention.

FIG. 7 shows an exemplary network arrangement for the purpose of explaining the second exemplary updating, and FIG. 8 shows an operation sequence for the second exemplary updating of the database 3. In FIG. 7, it is assumed that the owner of the network Nx is X, and some person A has already learned the node information for two names "foo" and "bar" from the network owner X, as the information regarding the network Nx (step S11). The person A is assumed to be not directly connected to the network Nx.

Then, the renumbering occurs in the network Nx, such that the network prefix is changed (step S12). In this case, when the network owner X meets the person A, the network owner X must inform that the network prefix has been changed, but suppose that the network owner X has already forgotten what had been informed to the person A before.

At this point, the person A selects one of the network interface IDs that the person A has already learned about the network Nx, and inform its hash value to the network owner X (step S13). Here, the hash value is obtained by inputting the selected interface ID into a hash function.

Note that it is not absolutely necessary to use the hash function, and any one way function capable of realizing the irreversible conversion can be used.

The network owner X searches for an entry that matches the hash value among the entries possessed by the network owner X, and if such an entry is found, the network owner X notifies the content of the entry by removing the corresponding interface ID, to the person A (step S14). Then, the person A updates the own database 3 according to the notified content of the entry (step S15).

By carrying out such a procedure, the network owner X can avoid informing all the entries unnecessarily, even when what had been informed to the person A before. Also, the person A can update the database 3 according to the change of the names on the network 1, even if the person A is not connected to the network 1.

Figure 9:
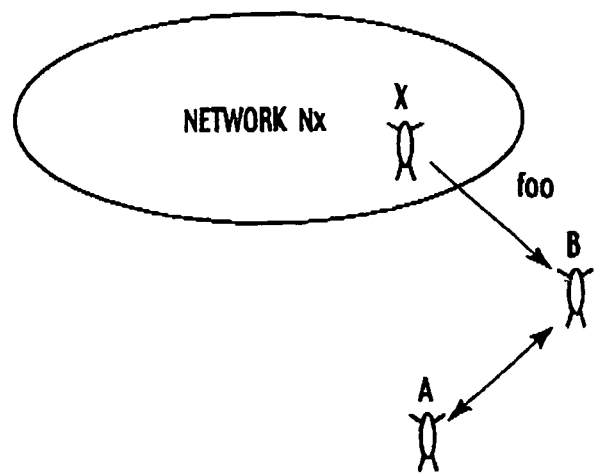
FIG. 9 is a diagram showing a network arrangement for explaining a modified case of a second exemplary updating of a database according to one embodiment of the present invention.

The second exemplary updating described above can also be utilized for the updating by being told by the other while protecting the privacy. For example, as shown in FIG. 9, suppose that the person B has already learned only the information regarding the name "foo" from the network owner X, as the information regarding the network Nx. Namely, this is the case where the network owner X does not wish to inform the information regarding the name "bar" to the person B, for example.

It is assumed that the fact that the network owner X has made the change of the names is not a secret. When the person A meets the person B, the person A learns the hash value of the interface ID already possessed by the person B. If this hash value matches with the interface ID possessed by the person A, the person A informs only the corresponding entry by removing the interface ID, to the person B.

In this way, the person B can update the information that the person B has already possessed, but cannot acquire any new entry. Namely, the person B cannot obtain information other than the information already known by the person B. Similarly, the person A cannot obtain information of a new node on the network Nx front the person B.

In this way, the second exemplary updating notifies the name update information to the correspondent only when the hash value matches, so that the privacy can be protected and the security can be improved.

(Third Exemplary Updating)

The third exemplary updating registers the network prefix in the DNS, and indicates the value of the network prefix by the FQDN.

In the third exemplary updating, the FQDN is stored as the network prefix in the database 3 of each node. The conversion between the network prefix and the FQDN is carried out by the DNS. The DNS is connected to the network 1 separately from each node.

In the case where the network owner X has some FQDN regarding the own network 1, namely in the case where the network owner X has a domain for the own network 1, the value of the network prefix in the entry can be given by the FQDN indicating the prefix, rather than the actual prefix.

When the need for the address resolution arises, the network prefix corresponding to the FQDN stored in the database 3 is inquired to the DNS. The responding unit 5 makes a response by generating the IPv6 address by using the network prefix returned from the DNS.

The database 3 of each node stores the value corresponding to the FQDN instead of the network prefix, so that at a time of the renumbering, it suffices to update the value of the FQDN. Each node checks the value corresponding to this FQDN regularly, and when there is a request for the IPv6 address of some node from another node, the response is made by generating the IPv6 address from the network prefix corresponding to the latest FQDN and the interface ID. Namely, it is tedious to inquire the network prefix corresponding to the FQDN to the DNS every time there is a request for IPv6 address, so that the network prefix inquired to the DNS in the past is cached, and when a request for IPv6 address is made from another node, the network prefix is read out from this cache and transmitted to another node. In this way, it is possible to make a response to the address request faster. Of course, it is also possible to check the DNS every time.

For example, suppose that a domain called Nx.org exists, that is, the DNS manages information of "network.Nx.org is 3ffe::" and information of "3ffe:: is Nx.org" for a reverse look-up.

When some node stores the node information into its own database 3, the reverse look-up of the network prefix is carried out, and if the FQDN is set in corresponding to that, the normal look-up of that FQDN is carried out to confirm that the value coincides, and the FQDN ("network.Nx.org" in this example) is stored into its own database 3 as the network prefix. The FQDN stored in the database 3 can be updated by inquiring to the network 1 appropriately.

In this way, the third exemplary updating stores the FQDN instead of the network prefix in the database 3 of each node, so that the node information becomes easier to comprehend compared with the case of storing the network prefix which is a randomized character string.

In the embodiment described above, the exemplary case where each node has the IPv6 address has been described, but the address is not necessarily limited to this and it is also possible to use the IPv4, for example.

As described above, according to the present invention, even when the node information on the network is changed, each node can learn the occurrence of the change by a simple procedure. Also, it is possible to transmit the node information to the other nodes on the network, while maintaining the privacy.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the name resolution device of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A name resolution device for managing a name of each node which is connected to a network and whose position on the network can be changed, and an address for identifying each node, comprising:

a node information storing unit configured to store a node information containing a name of a node, a network identification information, a prefix indicating a position of a node on the network, and an interface identification information of a node, for each node;

a node information collecting unit configured to collect the node information of other nodes connected to the network, through the network;

a node information updating unit configured to update the node information stored in the node information storing unit, according to the node information of the other nodes collected by the node information collecting unit, by updating the prefix stored in the node information storing unit by using the interface identification information contained in the node information collected by the node information collecting unit as a key;

a function conversion unit configured to convert the interface identification information corresponding to a prescribed node among the node information stored in the node information storing unit, by using a one-way function;

a comparing unit configured to, under a condition where a prefix corresponding to the interface identification information of the prescribed node stored in another node, not connected to the network, differs from a prefix corresponding to the interface identification information of the prescribed node, shared with the another node and stored in the node information storing unit, compare the interface identification information converted by using the one way function which is received from another node, with the interface identification information as converted by the function conversion unit, in order to allow the another node to obtain the prefix corresponding to the interface identification information of the prescribed node, shared with the another node and stored in the node information storing unit; and a node information providing unit configured to provide the prefix corresponding to the interface identification information compared by the comparing unit to the another node, but without the interface identification information, only when it is judged that the converted interface identification information from the function conversion unit coincides with the converted interface identification information from the another node at the comparing unit.

2. The name resolution device of claim 1, wherein the node information updating unit updates the node information stored in the node information storing unit for which the interface identification information coincides with that of the node information collected by the node information collecting unit but the prefix does not coincide with that of the node information collected by the node information collecting unit.

3. The name resolution device of claim 1, wherein the function conversion unit uses a hash function as the one way function.

4. The name resolution device of claim 1, further comprising:
   a prefix conversion unit configured to convert the prefix into a position identification information which is in one-to-one correspondence to the prefix;
   wherein the node information storing unit stores the position identification information obtained by the prefix conversion unit, as the prefix.

5. The name resolution device of claim 1, further comprising:
   an address generation unit configured to generate an IPv6 address dynamically, according to the node information stored in the node information storing unit.

6. A name resolution method for managing a name of each node which is connected to a network and whose position on the network can be changed, and an address for identifying each node, comprising:
   storing a node information containing a name of a node, a network identification information, a prefix indicating a position of a node on the network, and an interface identification information of a node, for each node;
   collecting the node information of other nodes connected to the network, through the network;
   updating the node information stored by the storing, according to the node information of the other nodes collected by the collecting, by updating the prefix stored by the storing by using the interface identification information contained in the node information collected by the collecting as a key;
   converting the interface identification information corresponding to a prescribed node among the node information stored by the storing, by using a one way function;
   under a condition where a prefix corresponding to the interface identification information of the prescribed node stored in another node, not connected to the network, differs from a prefix corresponding to the interface identification information of the prescribed node, shared with the another node and stored by the storing, comparing the interface identification information converted by using the one way function which is received from the another node, with the interface identification information as converted by the converting, in order to allow the another node to obtain the prefix corresponding to the interface identification information of the prescribed node, shared with the another node and stored by the storing; and
   providing the prefix corresponding to the interface identification information compared by the comparing to the another node, but without the interface identification information, only when it is judged that the converted interface identification information coincides with the converted interface identification information from the another node at the comparing.

7. The name resolution method of claim 6, wherein the updating updates the node information stored by the storing for which the interface identification information coincides with that of the node information collected by the collecting but the prefix does not coincide with that of the node information collected by the collecting.

8. The name resolution method of claim 6, wherein the converting uses a hash function as the one way function.

9. The name resolution method of claim 6, further comprising:
   converting the prefix into a position identification information which is in one-to-one correspondence to the prefix;
   wherein the storing stores the position identification information obtained by the converting, as the prefix.

10. The name resolution method of claim 6, further comprising:
    generating an IPv6 address dynamically, according to the node information stored by the storing.

11. A non-transitory computer-readable medium having computer-executable instructions for performing a method for causing a computer to function as a name resolution device for managing a name of each node which is connected to a network and whose position on the network can be changed, and an address for identifying each node, the method comprising:
    storing a node information containing a name of a node, a network identification information, a prefix indicating a position of a node on the network, and an interface identification information of a node, for each node;
    collecting the node information of other nodes connected to the network, through the network;
    updating the stored node information according to the collected node information of the other nodes by updating the stored prefix using the interface identification information contained in the collected node information as a key;
    converting the interface identification information corresponding to a prescribed node among the stored node information, by using a one way function;
    under a condition where a prefix corresponding to the interface identification information of the prescribed node stored in another node, not connected to the network, differs from a prefix corresponding to the interface identification information of the prescribed node, shared with the another node and stored by the storing, comparing the interface identification information converted by using the one way function which is received from the another node, with the converted interface identification information, in order to allow the another node to obtain the prefix corresponding to the interface identification information of the prescribed node, shared with the another node and stored by the storing; and
    providing the prefix corresponding to the compared interface identification information to the another node, but without the interface identification information, only when it is judged that the converted interface identification information from the one way function conversion coincides with the converted interface identification information from the another node when comparing.

12. The computer-readable medium of claim 11, wherein the updating includes updating the stored node information for which the interface identification information coincides with that of the collected node information but the prefix does not coincide with that of the collected node information.

13. The computer-readable medium of claim 11, wherein the converting uses a hash function as the one way function.

14. The computer-readable medium of claim 11, further comprising:
    converting the prefix into a position identification information which is in one-to-one correspondence to the prefix;
    wherein the storing includes storing the converted position identification information as the prefix.

15. The computer-readable medium of claim 11, further comprising:
    generating an IPv6 address dynamically, according to the stored node information.

* * * * *